United States Patent
Yagi et al.

(10) Patent No.: US 11,875,542 B2
(45) Date of Patent: Jan. 16, 2024

(54) PARKING ASSIST SYSTEM

(71) Applicant: SUBARU CORPORATION, Tokyo (JP)

(72) Inventors: Otoki Yagi, Tokyo (JP); Masayoshi Koiji, Tokyo (JP); Reo Harada, Tokyo (JP); Tomomi Heta, Tokyo (JP); Cong Kien Nguyen, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/866,226

(22) Filed: Jul. 15, 2022

(65) Prior Publication Data

US 2023/0028489 A1 Jan. 26, 2023

(30) Foreign Application Priority Data

Jul. 26, 2021 (JP) .................. 2021-121761

(51) Int. Cl.
*H04N 5/44* (2011.01)
*G06V 20/58* (2022.01)
*B60W 30/06* (2006.01)
*B60W 50/14* (2020.01)
*B60W 50/00* (2006.01)

(52) U.S. Cl.
CPC ........... *G06V 20/586* (2022.01); *B60W 30/06* (2013.01); *B60W 50/14* (2013.01); *B60W 2050/0083* (2013.01); *B60W 2050/146* (2013.01); *B60W 2420/42* (2013.01); *B60W 2540/215* (2020.02)

(58) Field of Classification Search
CPC .... G06V 20/586; B60W 30/06; B60W 50/14; B60W 2050/0083; B60W 2050/146; B60W 2420/42; B60W 2540/215; B62D 15/0285
See application file for complete search history.

(56) References Cited

U.S. PATENT DOCUMENTS

2009/0243889 A1* 10/2009 Suhr ............... G08G 1/168
340/932.2
2011/0210868 A1* 9/2011 Yano ............... G01B 11/24
340/932.2

(Continued)

FOREIGN PATENT DOCUMENTS

JP 2021-003926 A 1/2021

*Primary Examiner* — Munear T Akki
(74) *Attorney, Agent, or Firm* — Rimon, P.C.

(57) ABSTRACT

A parking assist system for a vehicle includes an environment information obtainer, a sufficient parking space setter, a parked-vehicle inter-space calculator, a parking capable space setter, and a parking assister. The environment information obtainer obtains environment information around the vehicle. The sufficient parking space setter sets a sufficient parking space for the vehicle by including a parking allowance width on each of left and right sides of the vehicle. The parked-vehicle inter-space calculator calculates a space between parked vehicles, based on the obtained environment information. The parking capable space setter compares the space between the parked vehicles with the sufficient parking space and, when determining the space between the parked vehicles is greater than or equal to the sufficient parking space, sets the space between the parked vehicles to be a parking capable space. The parking assister guides the vehicle to the parking capable space.

13 Claims, 9 Drawing Sheets

(56) References Cited

U.S. PATENT DOCUMENTS

| | | | |
|---|---|---|---|
| 2015/0054661 A1* | 2/2015 | Noh | G08G 1/146 340/932.2 |
| 2016/0379496 A1* | 12/2016 | Cho | G08G 1/13 705/40 |
| 2017/0043808 A1* | 2/2017 | Yang | B62D 15/021 |
| 2018/0099661 A1* | 4/2018 | Bae | B62D 15/0285 |
| 2018/0315312 A1* | 11/2018 | Hayakawa | B60R 21/00 |
| 2018/0370566 A1* | 12/2018 | Kojo | B60R 21/00 |
| 2019/0009773 A1* | 1/2019 | Miyahara | B62D 15/028 |
| 2020/0282975 A1* | 9/2020 | Minase | B60L 15/30 |
| 2022/0274589 A1* | 9/2022 | Gao | B62D 15/0285 |
| 2022/0324436 A1* | 10/2022 | Kang | G08G 1/143 |

* cited by examiner

PARKING ASSIST SYSTEM

CROSS-REFERENCE TO RELATED APPLICATIONS

The present application claims priority from Japanese Patent Application No. 2021-121761 filed on Jul. 26, 2021, the entire contents of which are hereby incorporated by reference.

BACKGROUND

The disclosure relates to a parking assist system which is to be applied to a vehicle so as to let the vehicle smoothly park in a parking lot where the lines of parking spaces drawn on the road surface are not recognized.

Hitherto, a parking assist system which assists a driver in parking a vehicle within the lines of a parking space in a parking lot so as to reduce the burden on the driver is known. In this type of parking assist system, while a driver is driving a vehicle in a parking lot, a control unit detects options of available parking spaces and displays the detected options on a monitor. The driver then selects a desired one of the parking space options.

Then, the control unit forms a parking guiding route for guiding the vehicle to park in the parking space selected by the driver and assists the vehicle in automatically parking in the parking space in accordance with the parking guiding route. Alternatively, the driver drives and parks the vehicle by himself/herself by following the parking guiding route displayed on the monitor.

In the above-described known parking assist system, to let a vehicle park in a parking space, the lines of available parking spaces are first detected. If the road surface in a parking lot is covered with snow or mud after flooding, however, the parking space lines drawn on the road surface are difficult to recognize. In such a case, the parking assist system may fail to form a parking guiding route for guiding the vehicle to a parking space.

A driver usually wants assistance from a parking assist system under such a poor environment where parking space lines are difficult to recognize rather than under a good environment. Japanese Unexamined Patent Application Publication (JP-A) No. 2021-3926, for example, discloses the following technology. When parking space lines in a parking lot are difficult to identify due to snow, information on a pair of tracks, which are assumed to be a pair of tire tracks of a vehicle left on the snow, is first obtained. Then, a position at which the tire tracks are no longer found at the back of a parking space is determined to be a position at which the vehicle is to stop to park. Then, a target parking guiding route is formed to guide the vehicle to this position along the pair of tracks.

SUMMARY

An aspect of the disclosure provides a parking assist system configured to assist a vehicle in parking in a parking space of a parking lot. The parking assist system includes an environment information obtainer, a sufficient parking space setter, a parked-vehicle inter-space calculator, a parking capable space setter, and a parking assister. The environment information obtainer is configured to obtain environment information on an environment around the vehicle. The sufficient parking space setter is configured to set a sufficient parking space for the vehicle by including a parking allowance width on each of left and right sides of the vehicle. The parked-vehicle inter-space calculator is configured to calculate a space between parked vehicles, based on the environment information obtained by the environment information obtainer. The parking capable space setter is configured to compare the space between the parked vehicles calculated by the parked-vehicle inter-space calculator with the sufficient parking space set by the sufficient parking space setter. The parking capable space setter is configured to determine whether the space between the parked vehicles is greater than or equal to the sufficient parking space. Upon determining that the space between the parked vehicles is greater than or equal to the sufficient parking space, the parking capable space setter is configured to set the space between the parked vehicles to be a parking capable space. The parking assister is configured to guide the vehicle to the parking capable space.

An aspect of the disclosure provides a parking assist system configured to assist a vehicle in parking in a parking space of a parking lot. The parking assist system includes a sensor and circuitry. The sensor is configured to obtain environment information on an environment around the vehicle. The circuitry is configured to set a sufficient parking space for the vehicle by including a parking allowance width on each of left and right sides of the vehicle. The circuitry is configured to calculate a space between parked vehicles, based on the environment information obtained by the obtainer. The circuitry is configured to compare the calculated space between the parked vehicles with the sufficient parking space. The circuitry is configured to determine whether the space between the parked vehicles is greater than or equal to the sufficient parking space. Upon determining that the space between the parked vehicles is greater than or equal to the sufficient parking space, the circuitry is configured to set the space between the parked vehicles to be a parking capable space. The circuitry is configured to guide the vehicle to the parking capable space.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 7 is a bird's eye view of part of a parking lot illustrating a state in which parking capable spaces are being searched for;

DETAILED DESCRIPTION

According to the technology disclosed in JP-A No. 2021-3926, if the parking assist system fails to detect a pair of tire tracks left on the snow, parking assist control does not function even if a driver has visually recognized an available parking space. This may disappoint the driver.

When a driver is parking a vehicle in a parking lot of a store, for example, he/she usually tries to park in a parking space as close as possible to the store, especially under a poor environment where the parking lot is covered with snow or mud. As a result, many vehicles enter and exit from parking spaces near the store, and multiple types of tire tracks are accordingly left on the road surfaces of these parking spaces.

In such an environment, when a driver is parking a vehicle in a parking space with a parking assist function, the parking assist system selects a parking space where a pair of tracks are detected, which is a long way from the store. This causes inconvenience for occupants of the vehicle including the driver.

It is thus desirable to detect an available parking space even when the lines of parking spaces are not recognized and regardless of whether multiple types of tire tracks of vehicles having entered and exited from parking spaces are left or no tire tracks are left at all. It is also desirable to provide a parking assist system that can detect an available parking space in the above-described circumstances and environment when assisting the vehicle in parking in a parking space by using a parking assist function.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
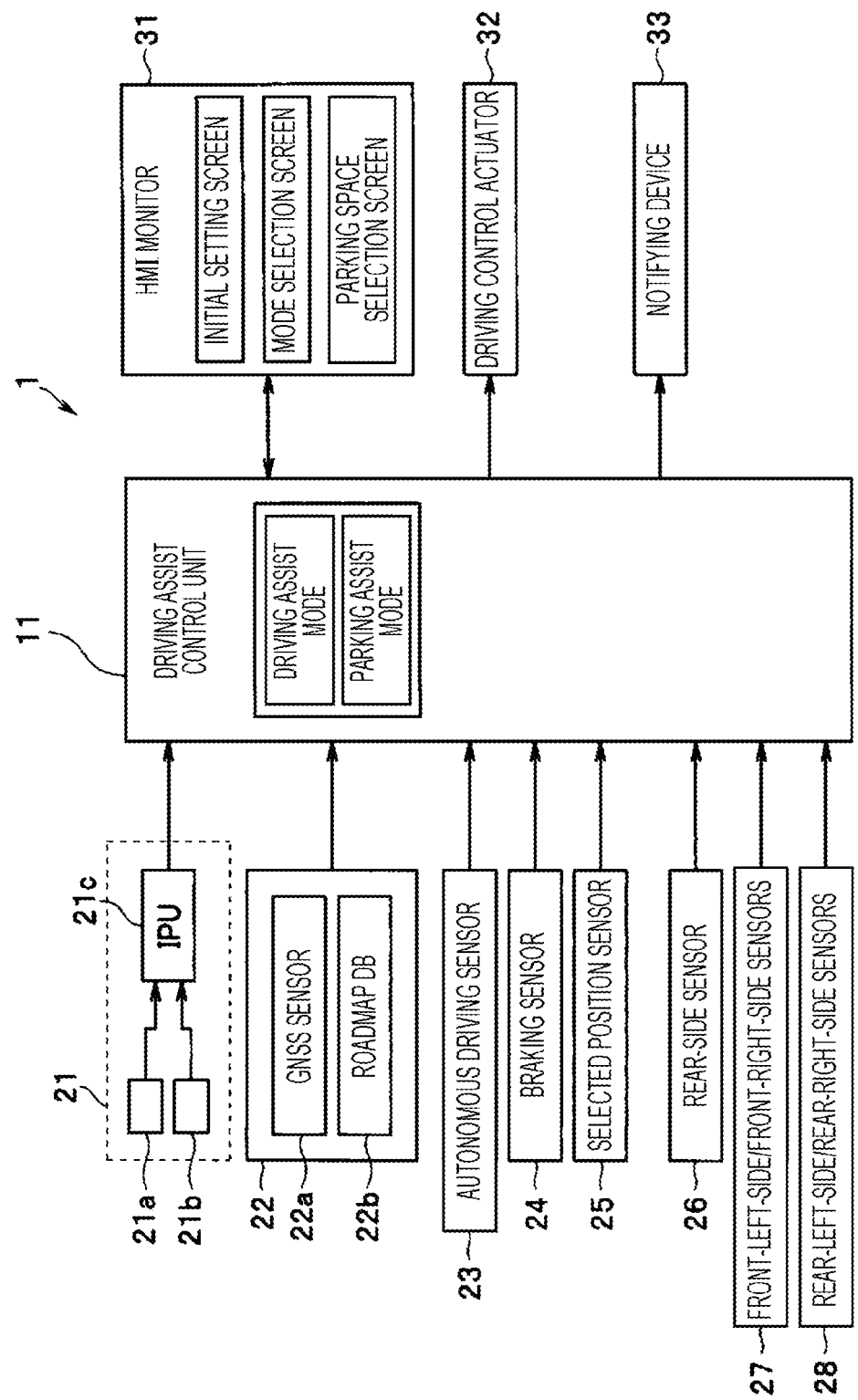
FIG. 1 is a schematic block diagram of a parking assist system.
Figure 7:
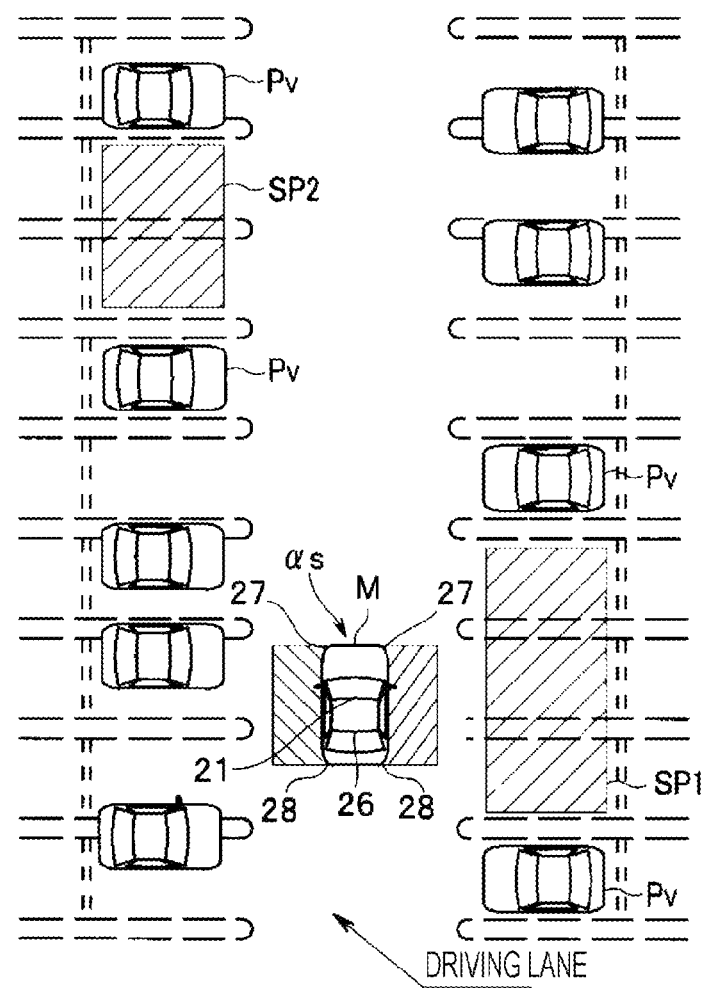
Figure 9:
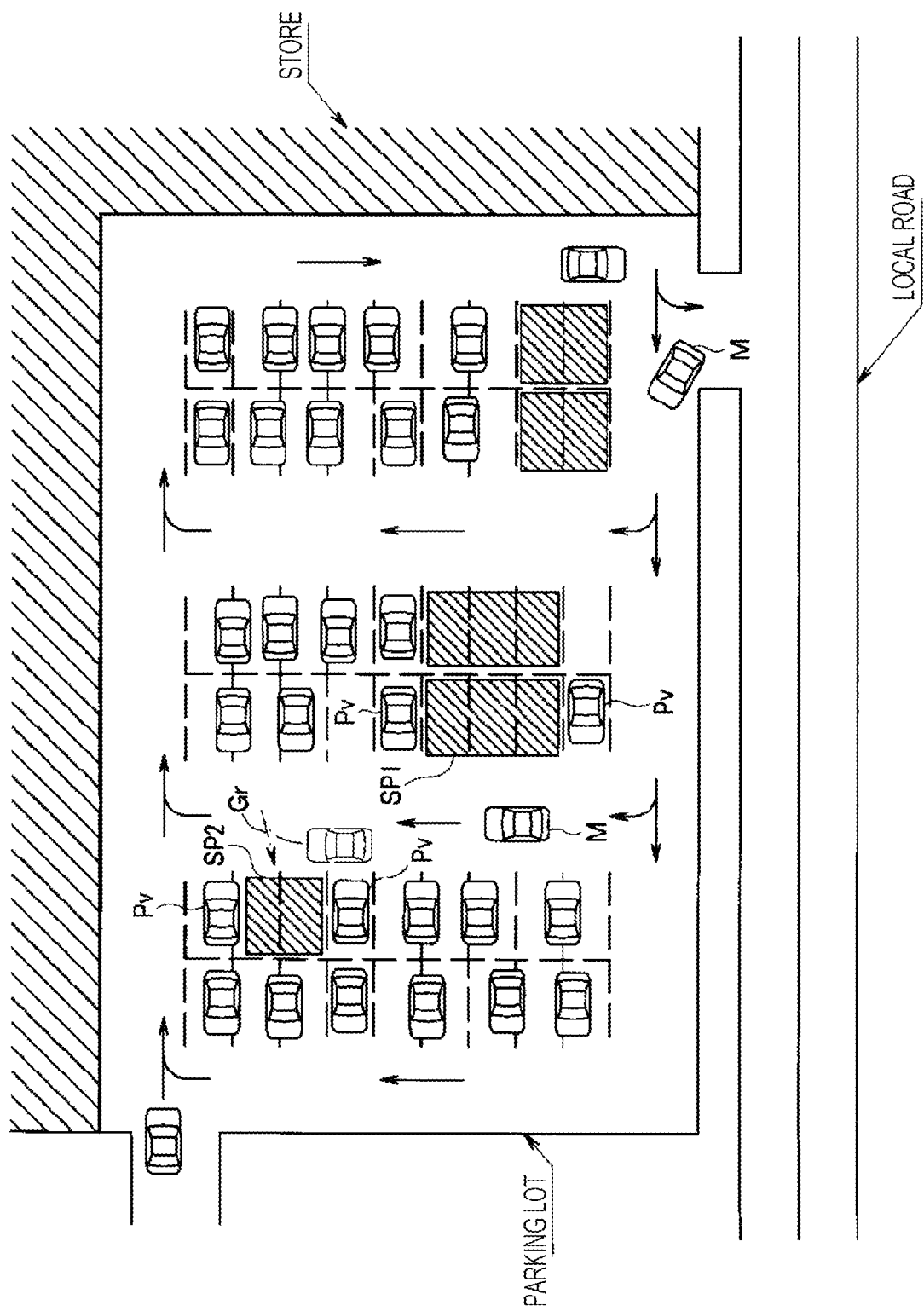
FIG. 9 is a bird's eye view of the entire parking lot where parking capable spaces are detected.

A parking assist system 1 illustrated in FIG. 1 is installed in a vehicle M (see FIGS. 7 and 9). The parking assist system 1 includes a driving assist control unit 11. The driving assist control unit 11 is constituted by a microcontroller including a central processing unit (CPU), a random access memory (RAM), a read only memory (ROM), a rewritable non-volatile memory (such as a flash memory or an electrically erasable programmable read only memory (EEPROM)), and a peripheral device. In the ROM, programs and fixed data, such as those for executing processing by the CPU, are stored. The RAM serves as a work area which is used for the CPU and temporarily stores various items of data used by the CPU. The CPU is also called a microprocessor (MPU) or a processor. Instead of a CPU, a graphics processing unit (GPU) or a graph streaming processor (GSP) may be used. Alternatively, a CPU, a GPU, and a GSP may be selectively combined and used.

When a driver has selected a desired assist mode, the driving assist control unit 11 performs driving assist in the selected assist mode. Assist modes provided by the driving assist control unit 11 are a driving assist mode and a parking assist mode. The driving assist mode is executed by the driving assist control unit 11 in the following manner. Based on vehicle position information obtained by a global navigation satellite system (GNSS) sensor 22a of a map locator unit 22, which will be discussed later, the driving assist control unit 11 performs map matching to match the position of the vehicle M onto a roadmap stored in a roadmap database 22b. The driving assist control unit 11 then causes the vehicle M to autonomously drive along a preset target traveling road in a self-driving zone. On a driving road where autonomous driving is difficult, the driving assist control unit 11 performs known driving control, such as vehicle-to-vehicle distance control (adaptive cruise control (ACC)), active lane keep (ALK) control, and lane departure prevention (LDP) control, to cause the vehicle M to drive along a driving lane and, if a leading vehicle is detected, to follow the leading vehicle.

After the vehicle M has entered a parking lot, when the driver selects the parking assist mode while driving the vehicle M by himself/herself in the parking lot, the driving assist control unit 11 searches for available parking spaces and lets the driver know. When the driver selects one of the available parking spaces, the driving assist control unit 11 causes the vehicle M to automatically park in the selected space.

Sensors and units that obtain information on the driving state (including the position and the direction) of the vehicle M and surrounding environment information of the vehicle M, which are used for executing the driving assist mode and the parking assist mode, are coupled to the input side of the driving assist control unit 11.

In the embodiment, as the sensors and units used for executing the driving assist mode and the parking assist mode, a front-side recognition sensor 21, a map locator unit 22, an autonomous driving sensor 23, a braking sensor 24, a selected position sensor 25, a rear-side sensor 26, front-left-side/front-right-side sensors 27, and rear-left-side/rear-right-side sensors 28 are provided. The braking sensor 24 turns ON a brake pedal by detecting an amount by which the driver has stepped on the brake pedal. The selected position sensor 25 detects a position selected as a result of the driver operating a select lever of transmission. The rear-side sensor 26 obtains information on the environment at the rear side of the vehicle M. In one embodiment, the front-side recognition sensor 21, the rear-side sensor 26, the front-left-side/front-right-side sensors 27, and the rear-left-side/rear-right-side sensors 28 may serve as an "environment information obtainer".

The front-side recognition sensor 21 is an image sensor. In the embodiment, the front-side recognition sensor 21 includes a stereo camera and an image processing unit (IPU) 21c. The stereo camera is constituted by a main camera 21a and a sub-camera 21b and uses charge-coupled devices (CCDs) or complementary metal oxide semiconductors (CMOSs), for example, as imaging elements. The main camera 21a and the sub-camera 21b have a predetermined base line length and are located on a front side of the vehicle M at a position above a rear-view mirror and near the windshield. The main camera 21a and the sub-camera 21b are disposed horizontally symmetrically along the width of the vehicle M with a space therebetween. The front-side recognition sensor 21 processes, by using the IPU 21c, an image of a predetermined area indicated by environment information obtained by the main camera 21a and the sub-camera 21b and sends the processed image to the driving assist control unit 11.

The map locator unit 22 includes a GNSS sensor 22a and a roadmap database 22b. The GNSS sensor 22a receives positioning signals emitted from multiple positioning satellites so as to obtain position coordinates of the vehicle M.

The roadmap database 22b is a large-capacity storage medium, such as a hard disk drive (HDD), and stores roadmap information. As the roadmap information, the roadmap database 22b stores various types of road information (such as local roads, highways, freeways, road shapes, road directions, lane widths, and the number of lanes) used for executing the driving assist mode and also stores static information on parking lots (such as position information of the entrances and exits of parking lots and site information on each parking lot) used for executing the parking assist mode.

The driving assist control unit 11 performs map matching to match the position coordinates (latitude, longitude, and altitude) of the vehicle M obtained by the GNSS sensor 22a onto a roadmap indicated by the roadmap information stored in the roadmap database 22b, thereby estimating the current position of the vehicle M on the roadmap.

The autonomous driving sensor 23 is a sensor set used for allowing the vehicle M to autonomously drive. The autonomous driving sensor 23 is constituted by sensors, such as a vehicle velocity sensor that detects the velocity of the vehicle M, a yaw rate sensor that detects a yaw rate acting on the vehicle M, and a longitudinal acceleration sensor that detects the longitudinal acceleration.

The rear-side sensor 26 is constituted by a combination of a monocular camera using CCDs or CMOSs, for example, as imaging elements and at least one of an ultrasonic sensor, a millimeter wave radar, a microwave radar, an infrared sensor, a laser radar, or light detection and ranging (LiDAR). Alternatively, the rear-side sensor 26 may include a stereo camera constituted by a main camera and a sub-camera, as in the above-described front-side recognition sensor 21.

The front-left-side/front-right-side sensors 27 are constituted by a front-left-side sensor and a front-right-side sensor which are respectively installed on the left and right ridges of a front bumper of the vehicle M, for example, and respectively scan the area from the obliquely front left side to the left side and the area from the obliquely front right side to the right side in a circular sector shape. The rear-left-side/rear-right-side sensors 28 are constituted by a rear-left-side sensor and a rear-right-side sensor which are respectively installed on the left and right ridges of a rear bumper of the vehicle M, for example, and respectively scan the area from the rear side to the left side and the area from the rear side to the right side, which are difficult to scan by the front-left-side/front-right-side sensors 27, in a circular sector shape. The front-left-side/front-right-side sensors 27 and the rear-left-side/rear-right-side sensors 28, which are each constituted by a millimeter radar, a microwave radar, and/or a LiDAR, for example, receive waves reflected by an object (such as a parked vehicle Pv when the parking assist mode is executed) so as to obtain environment information, such as the distance from the vehicle M to the object and the direction of the object.

The driving assist control unit 11 is coupled to a human machine interface (HMI) monitor 31. On the HMI monitor 31, various screens, such as an initial setting screen (see FIG. 6), a mode selection screen, and a parking space selection screen (see FIG. 8), are displayed. The initial setting screen is a screen for a driver to set initial settings before the driving assist control unit 11 starts executing the parking assist mode. The mode selection screen is a screen for instructing the driver to select one of the driving assist mode and the parking assist mode to be executed by the driving assist control unit 11. On the parking space selection screen, parking capable spaces, which will be discussed later, are displayed and the driver is instructed to select one of the parking capable spaces. The HMI monitor 31 may double as a multi-information display of a combination meter or a navigation display device (navigation monitor) of a car navigation system.

A driving control actuator 32 and a notifying device 33 are coupled to the output side of the driving assist control unit 11. The driving control actuator 32 is an actuator set including a power actuator, an electric power steering (EPS) actuator, and a brake actuator, for example, which assist the driving of the vehicle M. The power actuator controls output from drive sources, such as an engine and an electric motor. The EPS actuator controls driving of an EPS motor. The brake actuator adjusts the brake fluid pressure to be applied to a brake wheel cylinder provided in each wheel. The notifying device 33 supplies various types of voice information to the driver while the driving assist mode or the parking assist mode is being executed.

The driving assist control unit 11 has a parking assist control function to assist the vehicle M in parking in a parking space on behalf of the driver or to assist the driver in parking by himself/herself. For example, the driving assist control unit 11 performs parking assist control in accordance with a parking assist control routine illustrated in FIG. 3. This routine is executed at regular intervals after the system is started.

Figure 2:
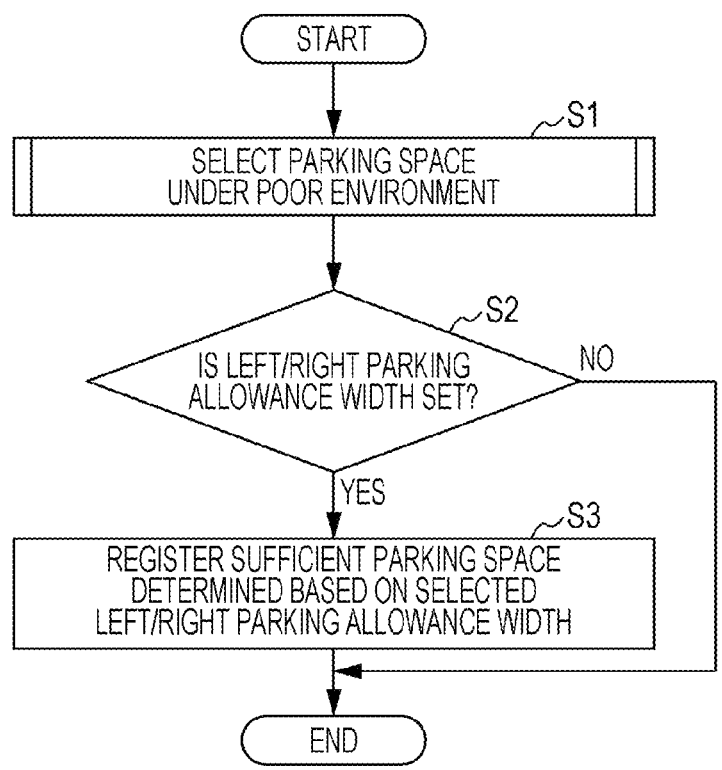
FIG. 2 is a flowchart illustrating a parking-space initial setting routine.
Figure 3:
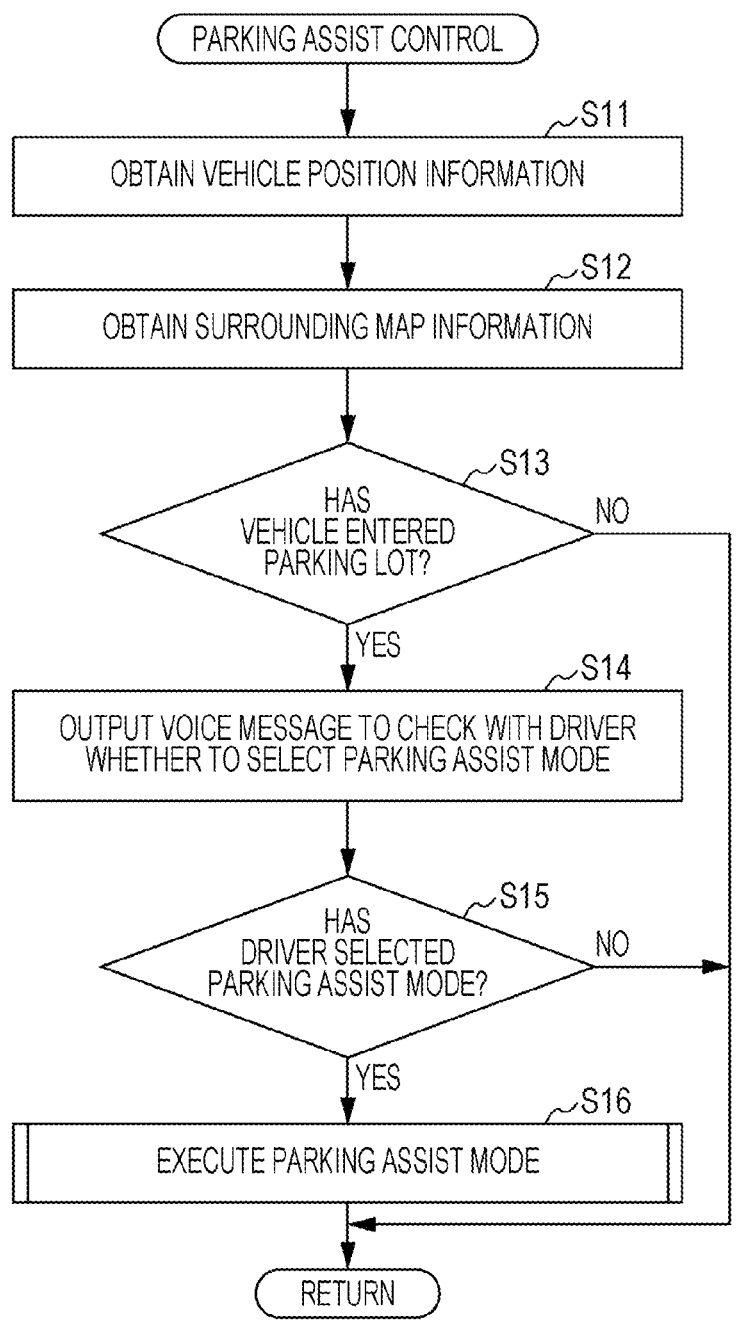
FIG. 3 is a flowchart illustrating a parking assist control routine.

Before explaining the parking assist control routine illustrated in FIG. 3, a parking-space initial setting routine illustrated in FIG. 2 will be discussed. In one embodiment, this routine may correspond to processing of a "sufficient parking space setter".

In this routine, the driver initially sets the left/right parking allowance width of the vehicle M, which will be read when the parking assist mode is executed. The routine is started when the driver has selected an "initial setting" field (not illustrated) on a menu of the mode selection screen displayed on the HMI monitor 31.

In step S1, the parking allowance width in the widthwise direction of the vehicle M which is used under a poor environment is set. In typical parking assist control, when assisting the vehicle M in parking in a parking space, the lines which define a target parking space are first recognized. Then, a target parking guiding route is set so that the widthwise center of the vehicle M matches that of the parking space defined by the parking space lines, and the vehicle M is guided to the target parking space in accordance with the target parking guiding route. In such typical parking assist control, however, it is not possible to form a target parking guiding route under a poor environment where parking space lines are not recognized because of snow or mud, for example, covering the road surface of a parking lot.

In the embodiment, to perform parking assist control under a poor environment where parking space lines are not recognized, in step S1, the left/right parking allowance width of the vehicle M is set in advance so that poor-environment parking assist processing can be executed to guide the vehicle M to a parking space.

Figure 6:
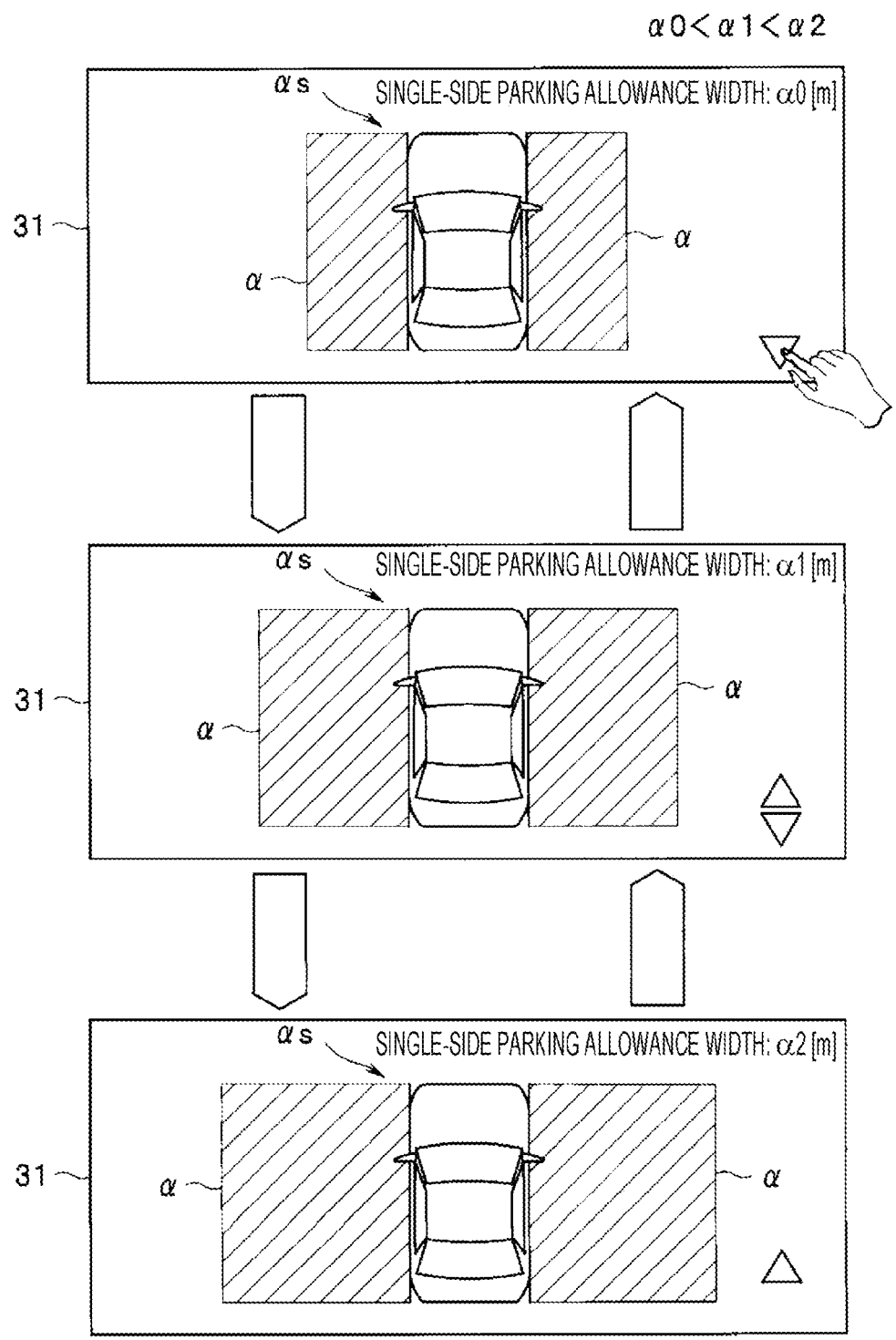
FIG. 6 illustrates a display example on a human machine interface (HMI) monitor when poor-environment parking space initial setting is performed.

The left/right parking allowance width can be set on a selection screen displayed on the HMI monitor 31. A display example of the selection screen for selecting the left/right parking allowance width is illustrated in FIG. 6. In this display example, the parking allowance width (left/right parking allowance width), which is to be set on each of the left and right sides of the vehicle M, can be selected step by step from multiple levels (three levels in this example). A selection screen for a single-side parking allowance width $\alpha 0$ is first displayed, as indicated on the top side of FIG. 6. The single-side parking allowance width $\alpha 0$ [m] is set at the shipping time of the vehicle M. When an inverted triangle (∇) button is touched, a screen for selecting a single-side parking allowance width α1 is displayed, as indicated on the middle side of FIG. 6. When the inverted triangle (∇) button is touched again, a single-side parking allowance width α2 is displayed, as indicated on the bottom side of FIG. 6. The left/right parking allowance width is set to become larger in multiple levels (three levels in this example), such as α0>α1>α2, and the region defined by the left/right parking allowance width and the longitudinal length of the vehicle M is set as an allowance space α. When a triangle (Δ) button displayed on the display screen on the middle and bottom sides of FIG. 6 is touched, the screen returns to the previous screen. The left/right parking allowance width may be selected from among four or more levels. Alternatively, the left/right parking allowance width may be selected from consecutively variable values.

Then, in step S2, it is determined whether the driver has selected a desired left/right parking allowance width. This determination can be made according to whether the driver has touched a "setting" button (not illustrated) on the HMI monitor 31, for example. If the "setting" button has been touched, the process proceeds to step S3. If the "setting" button has not been touched after the lapse of a predetermined time, it is determined that the driver has not set the left/right parking allowance width, and the routine is terminated.

In step S3, a sufficient parking space as (see FIGS. 6 and 7) for the vehicle M, which is determined based on the width of the vehicle M and the left/right parking allowance width α, is registered in a non-volatile memory, and the routine is completed. The sufficient parking space as is read in a poor-environment parking assist sub-routine illustrated in FIG. 5, which will be discussed later.

A parking assist control routine illustrated in FIG. 3 will be discussed below. This routine is executed at regular intervals after the driving assist control unit 11 starts operating. In step S11, the driving assist control unit 11 obtains vehicle position information from the map locator unit 22. In step S12, the driving assist control unit 11 obtains surrounding map information on the environment around the vehicle M from the map locator unit 22, based on the vehicle position information.

Then, in step S13, the driving assist control unit 11 performs map matching to match the position of the vehicle M onto the surrounding map so as to check whether the vehicle M has entered a parking lot. If the vehicle M is determined to have entered a parking lot, the driving assist control unit 11 proceeds to step S14. If the vehicle M has not entered a parking lot, the driving assist control unit 11 exits from the routine.

In step S14, the driving assist control unit 11 causes the notifying device 33 to output a voice message to check with the driver about whether to set the assist mode to the parking assist mode, and also displays the mode selection screen on the HMI monitor 31. Then, in step S15, the driving assist control unit 11 determines whether the driver has selected the parking assist mode. If the driver has selected the parking assist mode, the driving assist control unit 11 proceeds to step S16. If the driver has not selected the parking assist mode after the lapse of a predetermined time after the voice message is output or if the driver has selected manual driving on the HMI monitor 31, the driving assist control unit 11 exits from the routine.

Figure 4:
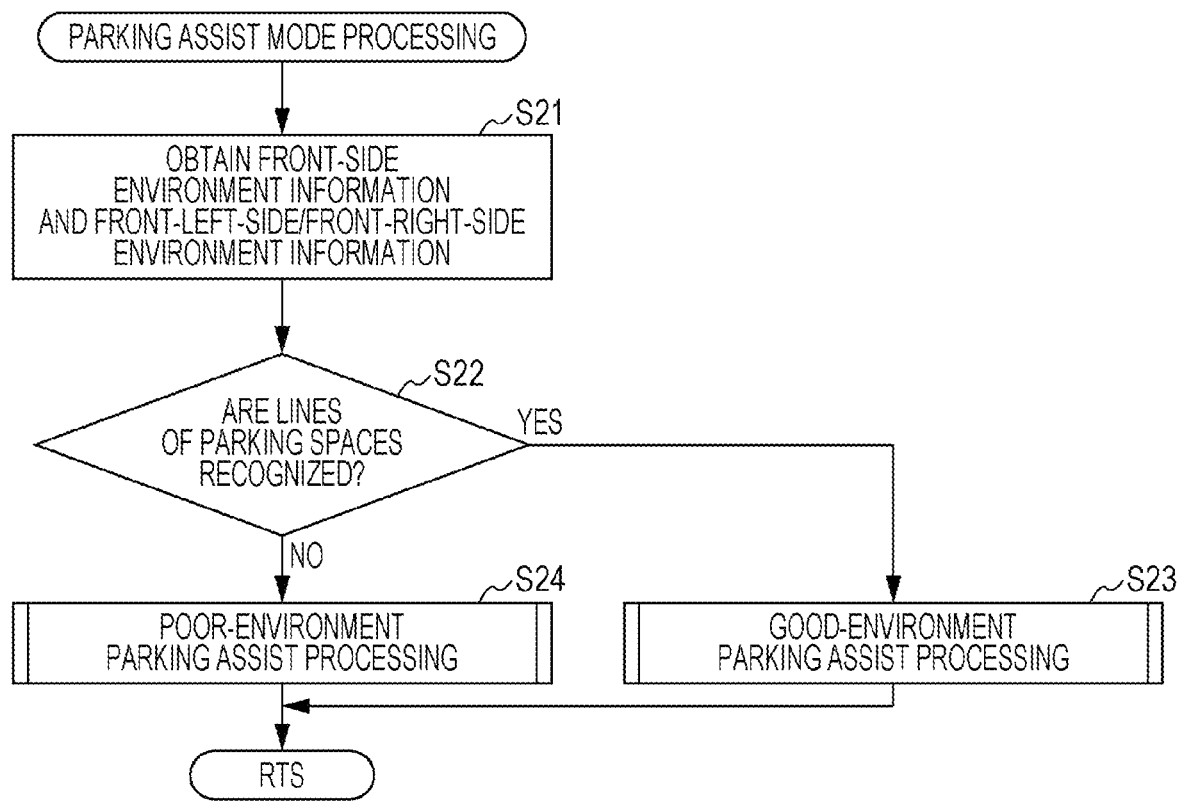
FIG. 4 is a flowchart illustrating a parking assist mode sub-routine.

In step S16, the driving assist control unit 11 executes the parking assist mode and exits from the routine. The parking assist mode is executed in accordance with a parking assist mode sub-routine illustrated in FIG. 4. In this sub-routine, in step S21, the driving assist control unit 11 obtains front-side environment information from the front-side recognition sensor 21 and front-left-side/front-right-side environment information from the front-left-side/front-right-side sensors 27.

Then, in step S22, from the obtained front-side environment information and front-left-side/front-right-side environment information, the driving assist control unit 11 checks whether the lines of parking spaces drawn on the road surface are being recognized. For example, based on the front-side environment information obtained from the front-side recognition sensor 21 and the front-left-side/front-right-side environment information obtained from the front-left-side/front-right-side sensors 27, the driving assist control unit 11 recognizes the parking space lines from the luminance difference between the road surface and the edges of the parking space lines or from a change in the intensity (reflectance) of light or waves reflected by the road surface and the parking space lines.

If it is determined in step S22 that the parking space lines are recognized, the driving assist control unit 11 proceeds to step S23. In step S23, the driving assist control unit 11 executes good-environment parking assist processing and then exits from the routine. Good-environment parking assist processing is the same as known parking assist processing for guiding a vehicle to a parking space based on parking space lines, and an explanation thereof will thus be omitted.

Conversely, if it is determined in step S22 that the parking space lines are not recognized, the driving assist control unit 11 proceeds to step S24. In step S24, the driving assist control unit 11 executes poor-environment parking assist processing and exits from the routine.

Figure 5:
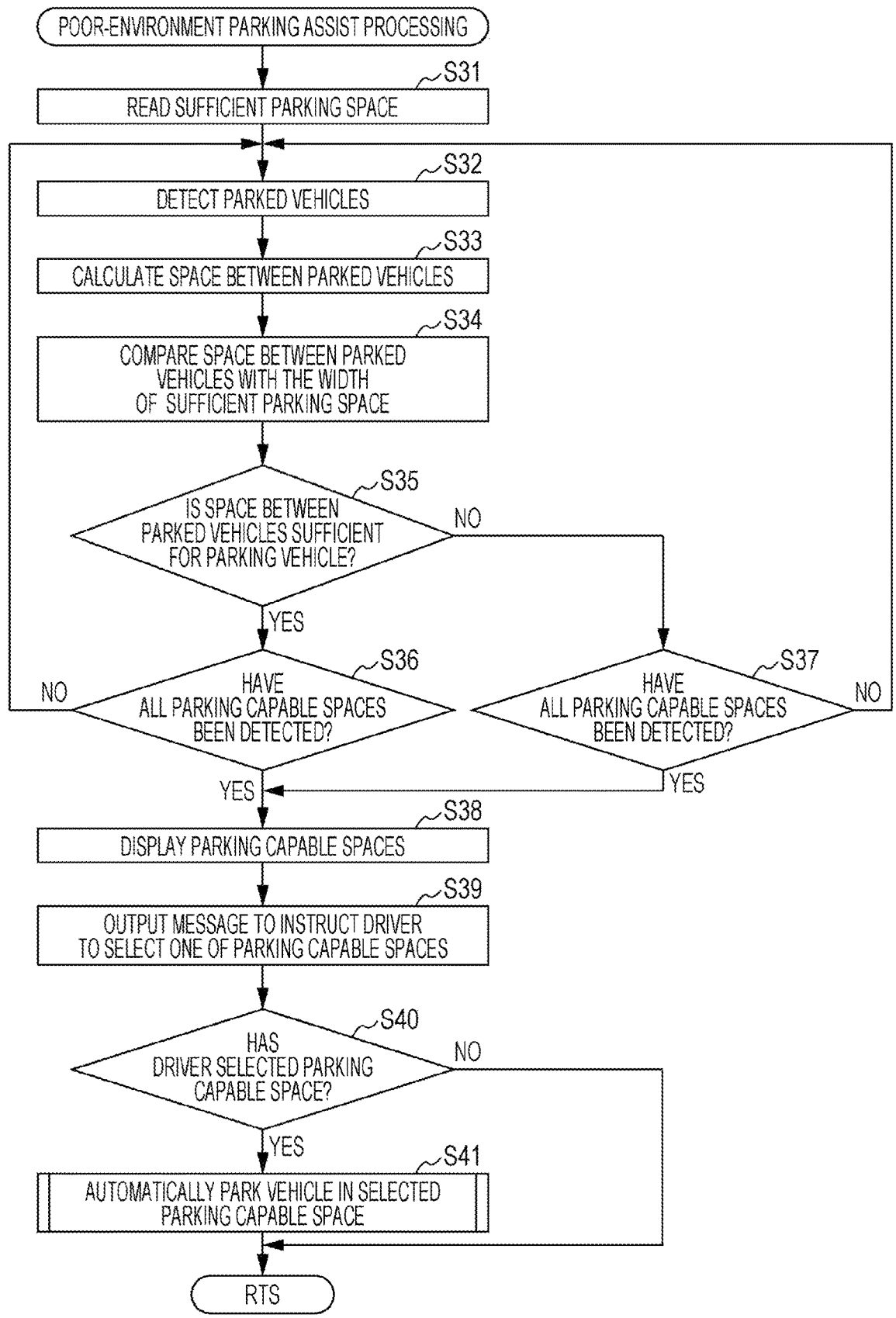
FIG. 5 is a flowchart illustrating a poor-environment parking assist sub-routine.

Poor-environment parking assist processing is executed in accordance with a poor-environment parking assist sub-routine illustrated in FIG. 5. In this sub-routine, in step S31, the sufficient parking space as registered in the parking-space initial setting routine in FIG. 2 is first read.

Then, in step S32, while the vehicle M is slowly driving in a driving lane in front of parking spaces arranged side by side in the parking lot, as illustrated in FIG. 7, the driving assist control unit 11 detects parked vehicles Pv parked on the left and right sides of the driving lane, based on the front-side environment information obtained from the front-side recognition sensor 21 and the front-left-side/front-right-side environment information obtained from the front-left-side/front-right-side sensors 27. If the driving lane is not recognized due to snow or mud, the driving assist control unit 11 predicts the location of the driving lane from map information on the parking lot and the position of the vehicle M. Alternatively, the driving assist control unit 11 may detect parked vehicles Pv and tire tracks left on the snow or mud, and determine as the driving lane a location where multiple tire tracks extend in one direction in front of the parked vehicles Pv.

Then, in step S33, based on the front-side environment information and front-left-side/front-right-side environment information, the driving assist control unit 11 calculates a space between adjacent parked vehicles Pv from the distance between the vehicle M and each of the vehicles Pv parked side by side along the driving lane. The space between the adjacent parked vehicles Pv is determined in the following manner, based on the front-side environment information and front-left-side/front-right-side environment information. Objects, such as parked vehicles Pv located side by side (see FIG. 9) and outer walls, are recognized, and the width of each of the objects (parked vehicles Pv and outer walls) and the forward distance from each object to the vehicle M are determined. From the determined widths and distances, the space between adjacent objects are calculated. In one embodiment, processing in step S33 may correspond to processing of a "parked-vehicle inter-space calculator".

Then, in step S34, the driving assist control unit 11 compares the calculated space between the adjacent parked vehicles Pv with the width of the sufficient parking space as. If the space between the adjacent parked vehicles Pv is greater than or equal to the width of the sufficient parking space as, the driving assist control unit 11 determines in step S35 that the space between the adjacent parked vehicles Pv is sufficient for parking the vehicle M (hereinafter such a space may also be called a parking capable space). The driving assist control unit 11 then proceeds to step S36. Conversely, if the space between the adjacent parked vehicles Pv is smaller than the width of the sufficient parking space as, the driving assist control unit 11 determines in step S35 that the space between the adjacent parked vehicles Pv is not sufficient for parking the vehicle M. The driving assist control unit 11 then branches off to step S37.

In step S36, the driving assist control unit 11 determines whether all possible candidates of parking capable spaces have been detected based on the front-side environment information and front-left-side/front-right-side environment information. If not all the possible candidates of parking capable spaces are detected, the driving assist control unit 11 returns to step S32 to search for the next possible candidate. If all the possible candidates of parking capable spaces have been detected, the driving assist control unit 11 proceeds to step S38.

In step S37, as in step S36, the driving assist control unit 11 determines whether all possible candidates of parking capable spaces have been detected based on the front-side environment information and front-left-side/front-right-side environment information. If not all the possible candidates are detected, the driving assist control unit 11 returns to step S32 to search for the next possible candidate. If all the possible candidates of parking capable spaces have been detected, the driving assist control unit 11 proceeds to step S38. In one example, processing in steps S34 through S37 may correspond to processing of a "parking capable space setter".

Figure 8:
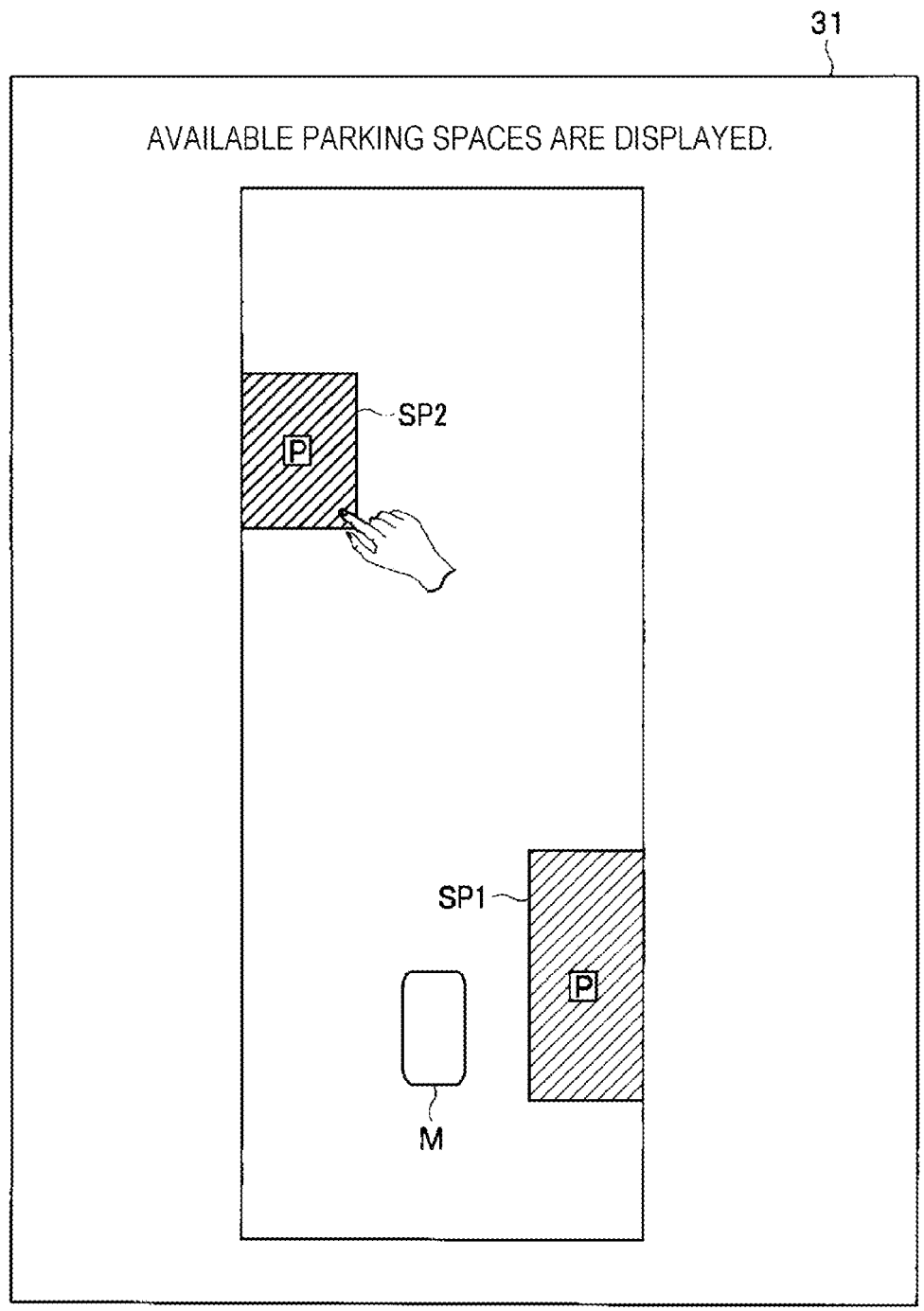
FIG. 8 illustrates a state in which parking capable spaces are displayed on an HMI monitor.

In step S38, the driving assist control unit 11 displays the detected parking capable spaces on the HMI monitor 31. Examples of the detected parking capable spaces displayed on the HMI monitor 31 are illustrated in FIG. 8. If, as illustrated in FIG. 7, a parking capable space SP1 on the near side of the driving lane is detected and a parking capable space SP2 on the far side of the parking lane is detected, the parking capable spaces SP1 and SP2 are displayed on the HMI monitor 31 as viewed from above.

The driving assist control unit 11 then proceeds to step S39 and drives the notifying device 33 to output a message to instruct the driver to select one of the parking capable spaces (SP1 and SP2 in FIG. 7) displayed on the HMI monitor 31. The driving assist control unit 11 then proceeds to step S40 to determine whether the driver has selected one of the parking capable spaces displayed on the HMI monitor 31. For instance, if, as illustrated in FIG. 8, the driver wishes to automatically park the vehicle M in the parking capable space SP2, he/she touches the parking capable space SP2 displayed on the HMI monitor 31. In one embodiment, processing in step S40 may correspond to processing of a "parking space selector".

If it is determined in step S40 that the driver has selected one of the parking capable spaces, the driving assist control unit 11 proceeds to step S41. If a predetermined time has elapsed after the message is output or if the vehicle M has passed by the parking capable spaces displayed on the HMI monitor 31, the driving assist control unit 11 exits from the routine.

In step S41, the driving assist control unit 11 causes the vehicle M to automatically park in the parking capable space selected by the driver (SP2 in FIGS. 7 and 9) and completes the routine.

For example, if the driver has chosen to automatically park the vehicle M in the parking capable space SP2, the driving assist control unit 11 first forms a target parking guiding route Gr for guiding the vehicle M to the parking capable space SP2, as illustrated in FIG. 9. The target parking guiding route Gr is set so that the widthwise center of the vehicle M matches the widthwise center of the parking capable space ST2. If, for example, the width of a parking capable space, such as the parking capable space SP1, is larger than the sufficient parking space as by a predetermined factor or greater (1.5 times, for example), the target parking guiding route Gr may be formed so that the vehicle M on the driver's seat side is separated from the adjacent parked vehicle Pv by the allowance space α (see FIG. 6).

Then, the driving assist control unit 11 performs control to automatically park the vehicle M in the parking capable space as determined above and exits from the routine. The target parking guiding route Gr is set similarly to when it is set under the normal condition where the lines of parking spaces are recognized. In one embodiment, processing in step S41 may correspond to processing of a "parking assister".

According to the above-described parking assist control, as a result of the vehicle M driving around the driving lane of the parking lot, information on the overall positions of the vehicles Pv parked in the parking lot can be obtained, as illustrated in FIG. 9. In this case, the overall positions of the parked vehicles Pv in the parking lot and the parking capable spaces indicated by the hatched portions in FIG. 9 may be displayed as viewed from above on the HMI monitor 31, in a manner similar to FIG. 8. Then, the driver may select a desired parking capable space.

As discussed above, in the embodiment, when assisting a vehicle in automatically parking in a parking space of a parking lot under a poor environment where the lines of parking spaces are not recognized due to snow or mud, a space between adjacent parked vehicles Pv is compared with the width of the sufficient parking space as to check whether the space between the adjacent parked vehicles Pv is sufficient for parking the vehicle M. With this configuration, regardless of whether multiple types of tire tracks of vehicles having entered and exited from a parking space are left or no tire tracks are left at all, which is observed in known art, easy automatic parking of the vehicle M in a parking space is achieved.

The disclosure is not restricted to the above-described embodiment. For example, in step S41, the target parking guiding route Gr may be displayed on the HMI monitor 31 such that it is superimposed on a plan view of the surroundings of a parking space where the vehicle M is to be parked, and the driver may park the vehicle M by himself/herself in accordance with the target parking guiding route Gr.

According to an embodiment of the disclosure, when guiding a vehicle to a parking space in a parking lot, a space between adjacent vehicles parked in the parking lot is first calculated and is compared with a parking space which is sufficient for parking the vehicle. If the space between the adjacent parked vehicles is determined to be larger than or equal to the sufficient parking space, it is determined that the space between the adjacent parked vehicles is sufficient for parking the vehicle. Then, the vehicle is guided to this space. With this configuration, even if the lines of parking spaces are not recognized under a poor environment where the road surface of a parking lot is covered with snow or mud and regardless of whether multiple types of tire tracks of vehicles having entered and exited from a parking space are left or no tire tracks are left at all, a parking space sufficient for parking the vehicle can be detected and the vehicle can be guided to this space.

The driving assist control unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assist control unit 11 including the driving assist mode and the parking assist mode. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A parking assist system configured to assist a vehicle in parking in a parking space of a parking lot, the parking assist system comprising:
    an environment information obtainer configured to obtain environment information on an environment around the vehicle;
    a sufficient parking space setter configured to set a sufficient parking space for the vehicle by including a parking allowance width on each of left and right sides of the vehicle;
    a parked-vehicle inter-space calculator configured to calculate a space between parked vehicles, based on the environment information obtained by the environment information obtainer;
    a parking capable space setter configured to compare the space between the parked vehicles with the sufficient parking space, determine whether the space between the parked vehicles is greater than or equal to the sufficient parking space, and, upon determining that the space between the parked vehicles is greater than or equal to the sufficient parking space, set the space between the parked vehicles to be a parking capable space; and
    a parking assister configured to guide the vehicle to the parking capable space.

2. The parking assist system according to claim 1, wherein the sufficient parking space setter is capable of variably setting the parking allowance width.

3. The parking assist system according to claim 1, wherein the parking assister is configured to guide the vehicle so that a widthwise center of the vehicle matches a widthwise center of the parking capable space.

4. The parking assist system according to claim 2, wherein the parking assister is configured to guide the vehicle so that a widthwise center of the vehicle matches a widthwise center of the parking capable space.

5. The parking assist system according to claim 1, wherein the parking assister is configured to
    determine a first position at which the vehicle is separated from one of the parked vehicles adjacent to a driver's seat side of the vehicle by the parking allowance width and determine a second position separated from the first position toward the vehicle by a length of the vehicle from an edge to a widthwise center of the vehicle;
    set the determined second position to a target parking guiding route; and
    guide the vehicle so that the widthwise center of the vehicle matches the target parking guiding route.

6. The parking assist system according to claim 2, wherein the parking assister is configured to
    determine a first position at which the vehicle is separated from one of the parked vehicles adjacent to a driver's seat side of the vehicle by the parking allowance width and determine a second position separated from the first position toward the vehicle by a length of the vehicle from an edge to a widthwise center of the vehicle;
    set the determined second position to a target parking guiding route; and
    guide the vehicle so that the widthwise center of the vehicle matches the target parking guiding route.

7. The parking assist system according to claim 1, further comprising:
    a parking space selector configured to, in a case where the parking capable space comprises multiple parking capable space, instruct a driver who drives the vehicle to select one of the parking capable spaces,
    wherein the parking assister is configured to guide the vehicle to the one of the parking capable spaces selected by the driver.

8. The parking assist system according to claim 2, further comprising:
    a parking space selector configured to, in a case where the parking capable space comprises multiple parking capable space, instruct a driver who drives the vehicle to select one of the parking capable spaces,
    wherein the parking assister is configured to guide the vehicle to the one of the parking capable spaces selected by the driver.

9. The parking assist system according to claim 3, further comprising:
    a parking space selector configured to, in a case where the parking capable space comprises multiple parking capable space, instruct a driver who drives the vehicle to select one of the parking capable spaces,
    wherein the parking assister is configured to guide the vehicle to the one of the parking capable spaces selected by the driver.

10. The parking assist system according to claim 4, further comprising:
    a parking space selector configured to, in a case where the parking capable space comprises multiple parking capable space, instruct a driver who drives the vehicle to select one of the parking capable spaces,
    wherein the parking assister is configured to guide the vehicle to the one of the parking capable spaces selected by the driver.

11. The parking assist system according to claim 5, further comprising:

a parking space selector configured to, in a case where the parking capable space comprises multiple parking capable space, instruct a driver who drives the vehicle to select one of the parking capable spaces, wherein the parking assister is configured to guide the vehicle to the one of the parking capable spaces selected by the driver.

12. The parking assist system according to claim 6, further comprising:

a parking space selector configured to, in a case where the parking capable space comprises multiple parking capable space, instruct a driver who drives the vehicle to select one of the parking capable spaces, wherein the parking assister is configured to guide the vehicle to the one of the parking capable spaces selected by the driver.

13. A parking assist system configured to assist a vehicle in parking in a parking space of a parking lot, the parking assist system comprising:

a sensor configured to obtain environment information on an environment around the vehicle; and circuitry configured to set a sufficient parking space for the vehicle by including a parking allowance width on each of left and right sides of the vehicle, calculate a space between parked vehicles, based on the environment information obtained by the obtainer, compare the calculated space between the parked vehicles with the sufficient parking space, determine whether the space between the parked vehicles is greater than or equal to the sufficient parking space, upon determining that the space between the parked vehicles is greater than or equal to the sufficient parking space, set the space between the parked vehicles to be a parking capable space, and guide the vehicle to the parking capable space.

* * * * *